United States Patent [19]

Morey

[11] 4,362,276

[45] Dec. 7, 1982

[54] PROCESS AND APPARATUS FOR RECOVERING METAL AND PLASTIC FROM INSULATED WIRE

[75] Inventor: Booker W. Morey, Pasadena, Calif.

[73] Assignee: Occidental Research Corporation, Irvine, Calif.

[21] Appl. No.: 858,633

[22] Filed: Dec. 8, 1977

[51] Int. Cl.³ .............................................. B02C 23/14
[52] U.S. Cl. ....................................... 241/24; 209/212; 241/79.1; 241/DIG. 38
[58] Field of Search ................. 241/20, 24, 79, 79.1, 241/DIG. 38; 209/212, 213

[56] References Cited

U.S. PATENT DOCUMENTS

| | | | |
|---|---|---|---|
| 3,074,653 | 1/1963 | Schorsch | 241/79.1 |
| 3,582,004 | 6/1971 | Lenz et al. | 241/20 |
| 3,705,694 | 12/1972 | Slocum | 241/79 |
| 3,749,322 | 7/1973 | Reynolds | 241/24 |
| 3,897,330 | 7/1975 | Rhys | 241/DIG. 38 |
| 3,941,684 | 3/1976 | Bradbury et al. | 241/24 |
| 4,031,004 | 6/1977 | Sommer, Jr. et al. | 209/212 |
| 4,062,767 | 12/1977 | Rudy | 209/212 |

Primary Examiner—Howard N. Goldberg

[57] ABSTRACT

Method and apparatus for recovering metal and plastic from plastic insulated wire. Plastic insulated wire is first chopped or otherwise comminuted to reduce the wire size. The bare metal, typically copper or aluminum, is separated from the insulation and insulated wire by aspiration or electrostatic separation. The plastic insulation is then separated from the insulated wire and any remaining bare metal by eddy current separation, typically in a linear induction motor, resulting in three fractions, the bare metal, the pure plastic, and the remaining plastic insulated wire pieces. The latter may be further processed, as by impact milling to separate the plastic from the metal, and then recycled to separate bare metal, plastic insulation, and insulated wire.

15 Claims, 1 Drawing Figure

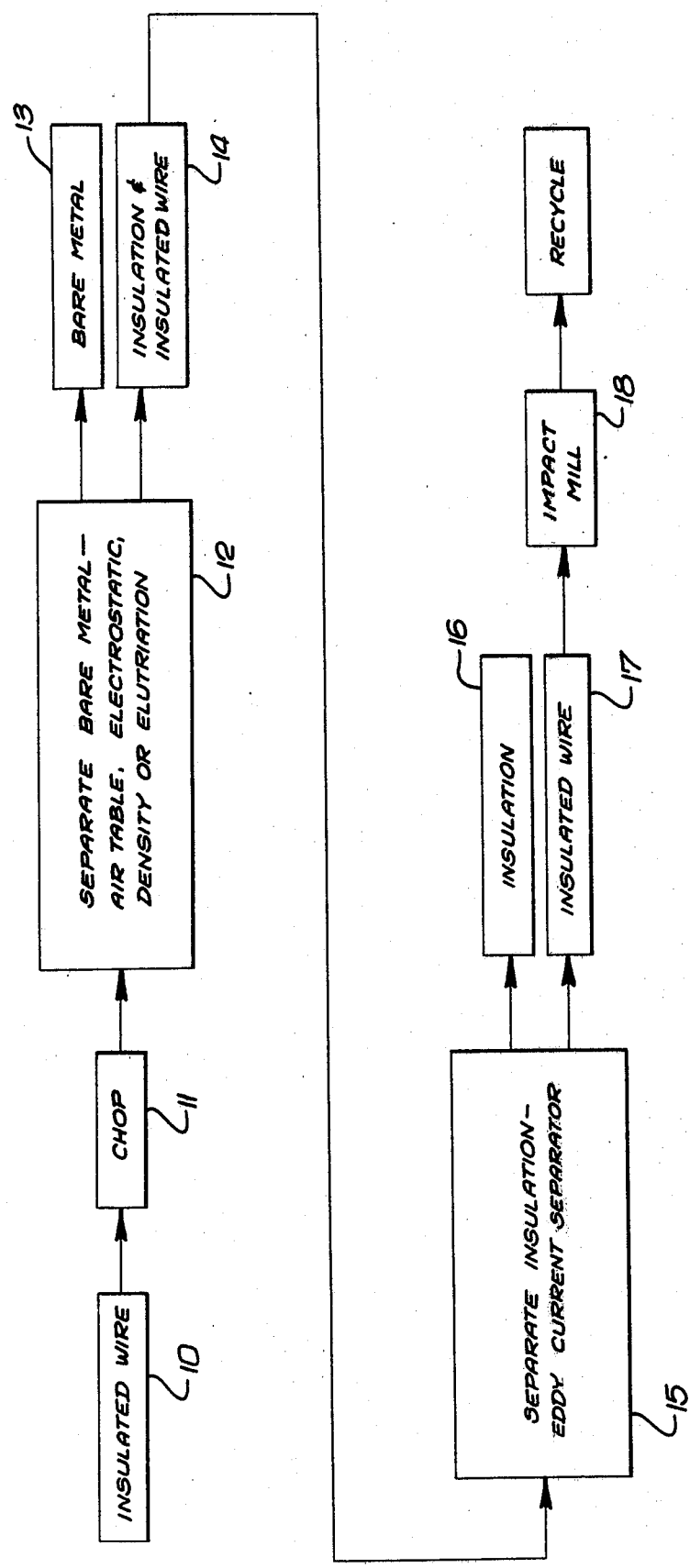

PROCESS AND APPARATUS FOR RECOVERING METAL AND PLASTIC FROM INSULATED WIRE

BACKGROUND OF THE INVENTION

This invention relates to new and improved methods and apparatus for the separation and recovery of metal and plastic from plastic insulated wire. Various systems have been utilized in the past for recovering various metals from scrap, and two such systems are shown in U.S. Pat. Nos. 3,749,322 and 3,941,684.

Typically, the scrap, in this case plastic insulated wire, is comminuted into small pieces, typically one-eighth inch in length, by conventional cutting, chopping or granulation techniques. Any magnetic metals can be removed from the mixture by conventional magnetic extraction devices. In the process of U.S. Pat. No. 3,749,322, the chopped pieces are then impact milled producing pieces of bare metal, loose insulation and metal with insulation thereon. The free plastic insulation is removed from the mixture by aspiration leaving metal and plastic covered metal pieces. The cycle may be repeated, with the ultimate hope that all the plastic will be removed from the wire so that after removal of the free plastic, the remainder will be substantially free metal.

In U.S. Pat. No. 3,941,684 the plastic-metal material is chopped or granulated and then passed through an aspirator type separator which produces a light fraction and a heavy fraction. The light fraction is then run through an impact-counterflow separator which removes fiber and dust, with the remainder being mixed with the heavy fraction. This resultant product may be sent to an electrostatic separator for separating metal and plastic.

These prior art processes have several disadvantages. Impact milling or some equivalent is extensively used. There is no provision for separation of insulation from insulation covered wire prior to any impact type treatment. The process of U.S. Pat. No. 3,749,322 is a substantially dry process, and the electrostatic separation of U.S. Pat. No. 3,941,684 requires a substantially dry mixture.

Accordingly, it is an object of the present invention to provide a new and improved method and apparatus for separation of metal and plastic from plastic insulated wire and in particular, process and apparatus wherein a portion of bare metal and a portion of free plastic can be obtained without requiring milling or the like.

Another object of the invention is to provide such method and apparatus utilizing a first separation step for removing bare metal and a second separation step with an eddy current separator for removing free plastic, where the second step may be performed on material which is damp or wet.

These and other objects, advantages, features and results will more fully appear in the course of the following description.

SUMMARY OF THE INVENTION

In the process of the invention, plastic insulated wire is comminuted to reduce the wire to small pieces. In the first separation step, the small pieces are separated into a first bare metal fraction and a second fraction containing plastic and plastic covered metal. In a second separation step, the plastic of the second fraction is separated by eddy current separation from the plastic covered metal. If desired, the plastic covered metal can be milled or otherwise treated to mechanically remove the insulation, and then recycled through the two separation steps.

The apparatus of the invention includes means such as a chopper for reducing the plastic covered wire to small pieces, a first separator for separating the bare metal from the plastic and plastic covered metal, a second eddy current separator for separating free plastic from the plastic covered metal, and means for moving the materials from unit to unit.

BRIEF DESCRIPTION OF THE DRAWING

The single FIGURE of the drawing is a schematic of a system illustrating the process of the invention.

DESCRIPTION OF THE PREFERRED EMBODIMENTS

Most electrical wire in use today is of copper or aluminum and is insulated with a plastic insulation. Both the metal and the plastic in scrap wire have an economic value and the present process and apparatus is designed to economically recover bare metal and free plastic from scrap.

In the present invention, the insulated wire indicated at 10 is comminuted into small pieces, using any of the conventional, cutting, chopping or granulation techniques, and chopping is indicated at 11. The size of the pieces after comminution desirably is chosen to maximize liberation of wire from insulation and is otherwise not critical. In a typical operation, the wire may be chopped or cut into about one-eighth inch lengths.

The comminuting step produces a mixture of bare metal, free plastic and plastic covered metal. This mixture is moved through a separator 12 to separate the bare metal from the insulation and insulated metal. Separator 12 may be a conventional piece of equipment such as an aspiration device or air table or high voltage electrostatic separator. Other suitable equipment for the separator 12 include density separators where the mix is placed in water or a heavy liquid or media, and elutriation separators. The bare metal fraction 13 produced by this separation step is substantially free of plastic insulation and ordinarily does not require further treatment.

The fraction 14 from the first separation step comprising the insulation and insulated wire is passed through a second separator 15 which is an eddy current separator, typically a linear induction motor. Eddy current separators, such as linear induction motors, are conventional units and are used for separating non-magnetic electrical conducting material from non-conducting material. In the present invention, the eddy current separator is utilized to separate the free insulation from the insulation covered wire. The insulation fraction 16 is substantially free of metal and ordinarily does not require further processing. The insulated wire fraction 17, which would include any bare metal not separated in the first separation at 12, may be further processed to mechanically separate the insulation from the metal. Typically this may be performed in an impact mill 18 or similar unit, after which the rsultant mixture is recycled through the separators 12 and 15.

If there is magnetic material in the initial load, this can be removed by conventional magnetic separation after the comminution step.

In one specific example, chosen to demonstrate the efficiency of the process, and not typical of normal liberation by chopping, size 12 copper wire with type TW insulation rated at 600 volts was cut into approximately one-eighth inch lengths. Some insulation separated from the metal during the cutting operation. The mixture contained about four percent bare copper wire, two percent free plastic insulation, and ninety-four percent insulation covered wire pieces. The mixture was run through a high voltage electrostatic separator and in this first separation step, ninety-one percent of the bare wire was removed. About eight percent of the insulated wire pieces were removed with the bare metal, but no free plastic was removed.

The non-conductor fraction contained 0.4% bare wire, 2.5% free plastic insulation, and the remainder was insulation covered wire pieces. This fraction was then run through the eddy current separator in the second separation step and all of the bare metal and insulated metal were separated, leaving the free insulation fraction with no metal therein.

Normally there is no particular advantage in operating the mix dry, damp or wet, and the eddy current separator will work with a dry or a wet mix. However, it should be noted that electrostatic separators do not work with a damp or wet mix. This in one advantage of using an eddy current separator for separating the plastic from the insulated wire, i.e., the eddy current separator can be used where the preceeding separation step was a wet process such as density separation or water elutriation.

I claim:

1. In a process for separating plastic insulated, non-ferrous, electrical conducting wire into three fractions for recovering metal and plastic, the steps of:
   comminuting the plastic insulated, non-ferrous, electrical conducting wire to reduce the wire to small pieces;
   separating the small pieces into a first bare metal fraction and a second fraction containing plastic and plastic covered metal; and
   separating the plastic of said second fraction by eddy current separation from the plastic covered metal, providing a bare metal fraction, a plastic fraction, and a plastic covered metal fraction.

2. The process as defined in claim 1 including performing the first separation step by aspiration.

3. The process as defined in claim 1 including performing the first separation step by electrostatic separation.

4. The process as defined in claim 1 including performing the first separation step by density separation in a fluid.

5. The process as defined in claim 1 including performing the first separation step by water elutriation.

6. The process as defined in claim 1 including the step of impact milling the plastic covered metal, and
   recycling the milled product through the first and second separation steps.

7. An apparatus for separating plastic insulated, non-ferrous, electrical conducting wire into three fractions for recovering metal and plastic from plastic insulated wire, the combination of:
   comminution means for reducing said wire to small pieces;
   first separation means for separating bare metal from plastic and plastic covered metal;
   means for delivering said small pieces to said first separation means;
   second separation means of the eddy current type for separating plastic from plastic covered metal; and
   means for delivering said plastic and plastic covered metal from said first separation means to said second separation means,
   with said first separation means providing a bare metal fraction and with said second separation means providing a plastic fraction and a plastic covered metal fraction.

8. The apparatus as defined in claim 7 wherein said comminution means includes a wire chopper.

9. The apparatus as defined in claim 7 wherein said first separation means includes an aspirator.

10. The apparatus as defined in claim 7 wherein said first separation means includes an air table.

11. The apparatus as defined in claim 7 wherein said first separation means includes an electrostatic separator.

12. The apparatus as defined in claim 7 wherein said first separation means includes a density separator incorporating a fluid bath.

13. The apparatus as defined in claim 7 wherein said first separation means includes a water elutriation separator.

14. The apparatus as defined in claim 7 wherein said second eddy current separation means includes a linear induction motor.

15. The apparatus as defined in claim 7 including:
   impact milling means;
   means for delivering said plastic covered wire from said second separation means to said impact milling means; and
   means for delivering the milled product to said first separation means.

* * * * *